United States Patent
Stout

(10) Patent No.: US 6,935,656 B2
(45) Date of Patent: Aug. 30, 2005

(54) COMBINATION HITCH-MOUNTABLE UTILITY CART

(76) Inventor: James Veril Stout, 16005 Meridian Rd., Prunedale, CA (US) 95307

( * ) Notice: Subject to any disclaimer, the term of this patent is extended or adjusted under 35 U.S.C. 154(b) by 312 days.

(21) Appl. No.: 09/905,721

(22) Filed: May 28, 2002

(65) Prior Publication Data

US 2004/0119262 A1 Jun. 24, 2004

Related U.S. Application Data

(60) Provisional application No. 60/353,356, filed on May 28, 2002.

(51) Int. Cl.$^7$ ................................................ B60F 5/00
(52) U.S. Cl. ...................... 280/769; 280/64; 280/656; 280/43.1; 280/43.17
(58) Field of Search ............................. 280/43, 46, 63, 280/64, 43.13, 43.14, 475, 656, 43.15, 43.16, 43.17, 43.2, 43.21, 43.24, 762, 769, 43.1; 414/462, 467

(56) References Cited

U.S. PATENT DOCUMENTS

| | | | | |
|---|---|---|---|---|
| 4,593,840 A | * | 6/1986 | Chown | 224/520 |
| 4,666,359 A | * | 5/1987 | Parr | 414/485 |
| 4,978,104 A | * | 12/1990 | Gipson, Jr. | 254/420 |
| 5,161,814 A | * | 11/1992 | Walker | 280/414.5 |
| 5,354,090 A | * | 10/1994 | Grovom | 280/656 |
| 5,584,639 A | * | 12/1996 | Walker, Jr. | 414/476 |
| 5,738,261 A | * | 4/1998 | Dula | 224/533 |
| 6,113,130 A | * | 9/2000 | Saulce | 280/656 |
| 6,164,896 A | * | 12/2000 | Cummins | 414/462 |
| 6,213,491 B1 | * | 4/2001 | Southard, Jr. | 280/475 |
| 6,254,117 B1 | * | 7/2001 | Cross | 280/401 |
| 6,607,345 B2 | * | 8/2003 | McElhany | 414/462 |
| 6,739,604 B2 | * | 5/2004 | Cassoni | 280/47.131 |

OTHER PUBLICATIONS

U.S. Appl. No. 60/353,356, James V. Stout.

* cited by examiner

Primary Examiner—Christopher P. Ellis
Assistant Examiner—Brian Swenson
(74) Attorney, Agent, or Firm—Donald R. Boys; Central Coast Patent Agency, Inc.

(57) ABSTRACT

A receiver hitch-mountable utility cart has a support frame for supporting a payload, a hitch arm rigidly attached to the support frame, the hitch arm shaped to engage a receiver hitch bar of an over-the-road vehicle, a wheelbase assembly with wheels for transporting the cart with the wheels on the ground, and a user-operable translation mechanism connecting the wheelbase to the frame, enabling the frame to be raised and lowered relative to the wheelbase by operation of the translation mechanism, such that the cart, in an uppermost position, may be aligned and connected to the receiver hitch bar of the over-the-road vehicle, and the wheels may then be retracted to carry the cart entirely on the receiver hitch bar.

16 Claims, 10 Drawing Sheets

COMBINATION HITCH-MOUNTABLE UTILITY CART

CROSS-REFERENCE TO RELATED DOCUMENTS

The present invention claims priority to a U.S. provisional patent application Ser. No. 60/353,356, entitled Hitch-Mountable Cart, filed on May, 28, 2002, disclosure of which is included herein in its entirety by reference.

FIELD OF THE INVENTION

The present invention is in the field of utility carts and pertains particularly to a cart that may be easily loaded to and carried entirely on the receiver hitch bar of a towing vehicle, thereby increasing the load capacity of the vehicle while reducing labor to load.

BACKGROUND OF THE INVENTION

The art of loading and unloading heavy payloads or equipment into and out of service vehicles generally requires the use of loading equipment and/or considerable labor on the part of a person or persons performing the load/unload operations. The pest-control service industry, among many other industries, is one example of a service industry wherein frequent loading and unloading of equipment and various payloads into and out of service vehicles takes place.

Generally speaking, trailer apparatus are well known and available in the art for facilitating vehicle towing of equipment and other relatively heavy payloads. However, for some applications, especially those involving frequent loading and unloading, trailers are inadequate for the task because of bulk and weight of the trailer and difficulties hitching and unhitching. Moreover, many types of equipment must be moved to a secondary field location after unloading, which requires, in many instances, considerable additional labor.

Typically, trucks or carts which may be pushed or towed by hand or by such as an All Terrain Vehicle (ATV) are available and known in the art for transporting equipment and or a payload from a service vehicle or trailer attached thereto to a secondary field location. These devices are fairly standard and can be adapted for differing situations and loads. A problem with these sorts of carts and trucks is that typically they must be stowed somewhere with the load in the service vehicle or trailer.

As is well known in the art, trailers are hitchable to a towing vehicle using any of several known hitching methods and apparatus. A hitch is accomplished such that there is freedom of movement in both up and down direction for negotiating different terrain variations and in side-to-side direction for facilitating turning. However, because of a necessarily large wheelbase for trailers, they cannot be easily manipulated through narrow barriers such as standard gates or doors. Similarly, licensing requirements for a towable trailer necessitate a length and wheelbase dimensioning that would not cause instability in maneuvering while towing.

What is clearly needed is a utility cart apparatus with a combination of capabilities, including an ability to be carried entirely on a receiver hitch bar, an ability to be quickly loaded to and unloaded from the receiver hitch bar, and is still capable of being easily moved around a job site. Such a cart would enable loading, transport, and subsequent unloading and maneuverability of relatively heavy and, in some cases, awkwardly-positioned loads, while reducing traditional labor requirements associated with the complicated task.

SUMMARY OF THE INVENTION

In a preferred embodiment of the present invention a receiver hitch-mountable utility cart is provided, comprising a support frame for supporting a payload, a hitch arm rigidly attached to the support frame, the hitch arm shaped to engage a receiver hitch bar of an over-the-road vehicle, a wheelbase assembly with wheels for transporting the cart with the wheels on the ground, and a user-operable translation mechanism connecting the wheelbase to the frame, enabling the frame to be raised and lowered relative to the wheelbase, such that the cart, with the support frame in an uppermost position, may be aligned and connected to the receiver hitch bar of the over-the-road vehicle, and the wheels may then be retracted to carry the cart entirely on the receiver hitch bar.

In a preferred embodiment, after hitching the cart to the over-the-road vehicle, the user-operable translation mechanism may be urged to and locked in an upright position, lifting the wheelbase off of the ground while the cart is transported. Also in a preferred embodiment the wheelbase assembly comprises 2 wheels and a supporting axle. Further, the axle may comprise an axle housing and a pair of axle extension members enabling length extension of the wheelbase. The axle may be a drop-down axle for lowering the center of gravity of the cart.

In some cases the hitch-mountable cart has a jack assembly rigidly attached to the frame and to the axle of the wheelbase for providing assistance in lowering and lifting heavy payloads supported on the cart.

In a preferred embodiment the hitch-mountable cart is enabled to be transported on the wheelbase as a hand-truck when not coupled to the over-the-road vehicle. Also in preferred embodiments there may be a socket-type trailer hitch engaged to the hitch arm, enabling the cart to towed by a small tractor or an all-terrain vehicle at a job site. In some embodiments the wheels are freely rotatable caster wheels mounted to the axle with castor hardware.

In another aspect of the invention a method for transporting a receiver hitch-mountable cart by an over-the-road vehicle, the cart comprising a support frame for supporting a payload, a hitch arm rigidly attached to the support frame, the hitch arm shaped to engage a receiver hitch bar of an over-the-road vehicle, a wheelbase assembly with wheels for transporting the cart with the wheels on the ground, and a user-operable translation mechanism connecting the wheelbase to the frame, enabling the frame to be raised and lowered relative to the wheelbase by operation of the user-operable translation mechanism, the method comprising the steps of: (a) positioning the cart behind the service vehicle; (b) urging the translation mechanism downward to elevate the frame and the hitch apparatus to an elevation aligned for engaging the receiver hitch; (c) moving the cart forward to engage the receiver hitch; and (d) securing the coupling;

In some embodiments of the method a mechanical jack is imposed between the support frame and the wheelbase assembly, and in step (b) the jack is used to aid in raising or lowering of the support frame relative to the wheelbase assembly. Also in some embodiments there is a step (e) for urging the translation mechanism to an upright position, to elevate the cart wheels off of the ground. In step (e) the translation mechanism may be lockable into the upright position for secure transport.

In the embodiments having a mechanical jack, the mechanical jack may have a quick-release mechanism for disengaging the jack for rapid repositioning. In some cases the mechanical jack is a screw jack, and the quick-release mechanism comprises a half nut mounted on a spring-loaded retractable member, such that the half nut may be released from the jack screw, and the engagement-disengagement mechanism may be spring loaded and lever operated.

In embodiments of the invention taught in enabling detail below, for the first time a utility cart is provided that can be easily loaded to an over-the-road vehicle to be transported between job sites, without having to be licensed as a trailer, and may also be easily unloaded at the job site and be towed around the job site by a smaller towing vehicle, such as an ATV or small tractor.

BRIEF DESCRIPTION OF THE DRAWING FIGURES

DESCRIPTION OF THE PREFERRED EMBODIMENTS

According to a preferred embodiment of the invention, the inventor provides a hitch-mountable cart equipped with a user-operable translation mechanism for facilitating the hitch mount to a service or towing vehicle. The method and apparatus of the present invention is described in enabling detail by the following disclosure.

Figure 1:
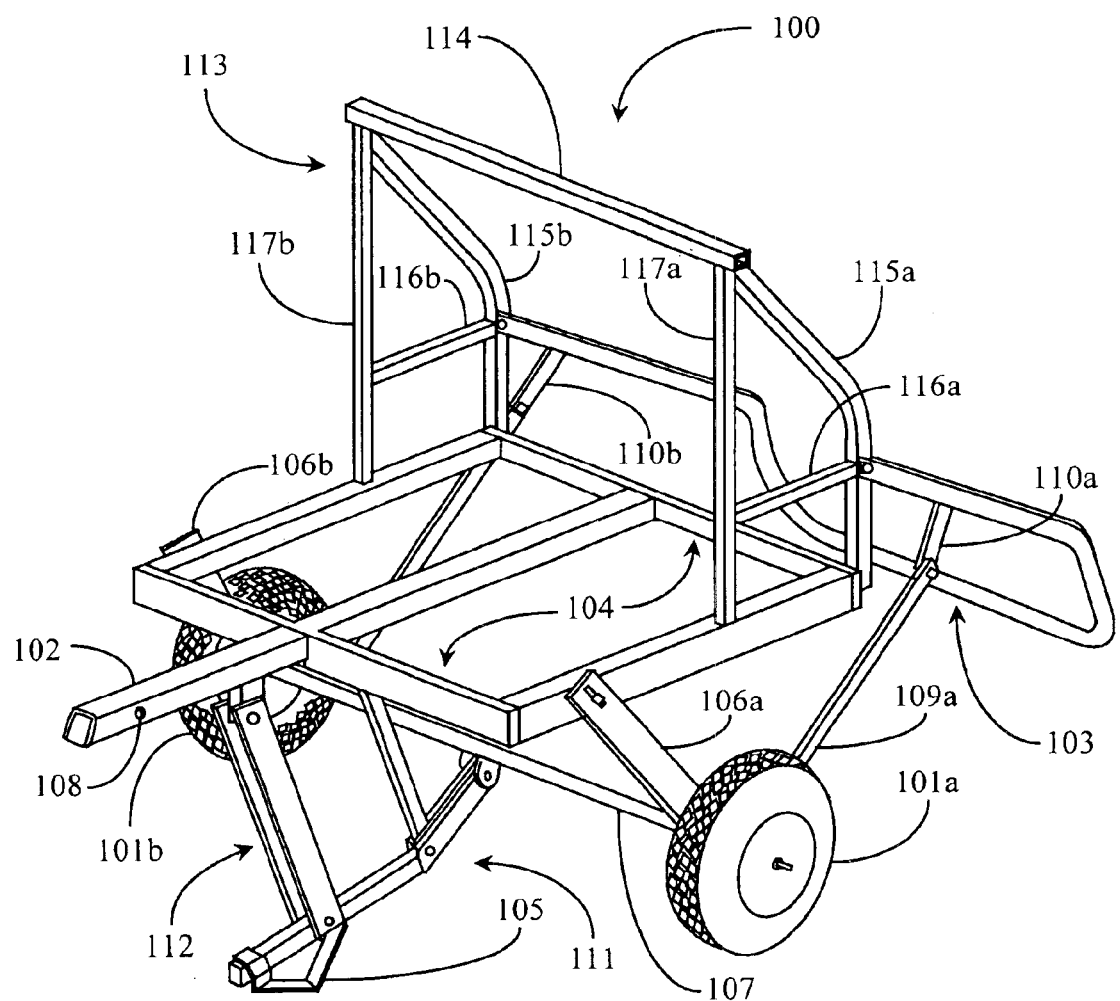
FIG. 1 is a perspective view of a hitch-mountable utility cart according to an embodiment of the present invention.

FIG. 1 is a perspective view of a hitch-mountable utility cart 100 according to an embodiment of the present invention. Cart 100 has a support frame 104 formed substantially in a rectangular configuration and adapted as a load support base and frame for supporting other features of the cart. Support frame 104 is manufactured from steel members in a preferred embodiment that are welded in position to form a solid and durable framework. In one embodiment of the invention frame 104 may comprise aluminum members and be fixed together by one of a number of known fastening techniques such as bolting, etc. In this example standard grade rectangular steel tubing is used. Support frame 104 is adapted to accept flooring (not shown) so that varying load types and configurations may be carried and secured on cart 100. In another embodiment cart 100 may be adapted to support specific loads, for example, equipment that is bolted or otherwise affixed to frame 104 by standoffs or other framing or bracket or support structures.

Cart 100 has a vertical support frame 113 fixedly attached in this embodiment upon support frame 104. Vertical frame 113 provides an extension of frame 104 useful for securing specific load types as well as for supporting moveable components of cart 100 such as a load lever 103, which is described in enabling detail below. Similar to frame 104, vertical frame 113 is rigid and can be formed by welding or other rigid fastening techniques. Frame 113 is preferably formed of steel tubing, rectangular tubing in this embodiment. In another embodiment, frames 104 and 113 may be formed of annular tubing or solid members.

Frame 113 in this example has 2 vertical support members 117a and 117b affixed at lower ends to frame 104 by welding or other fastening method. Members 117a and 177b are connected at their upper ends by a horizontal cross member 114. A rear portion of frame 113 is supported by angle bars 115a and 115b connected to vertical members 117a and 117b by lateral members 116a and 116b. Angle bars 115a and 115b are welded or otherwise rigidly attached to the rear portion of frame 104 and also at the opposite ends to cross member 114 at the junction of vertical members 117a and 117b to member 114. This configuration forms a rigid cage (frame 113) that is rigidly supported by frame 104. The combination of frames 104 and 113 provide a secure base for payloads including equipment secured thereto by fastening using standoffs, latches, hinges, chains, bungee cords, and/or other hardware.

At a front portion of cart 100 a trailer-hitch tongue 102 is provided for enabling a hitch coupling between cart 100 and a service vehicle. In some instances, especially for towing at a job site by such as an ATV, as mentioned above, a standard socket-type trailer hitch apparatus is mounted to tongue 102. Tongue 102 extends substantially out from cart 100 in a forward position in roughly the same plane as that occupied by frame 104, although this is not a requirement. In one embodiment, tongue 102 is contiguous with a longitudinal cross member extending from the front cross member of frame 104 to the rear cross member of frame 104, as is shown in FIG. 1. In this case the front cross member of frame 104 is modified to accept the extension. Tongue 102 is formed, in a preferred embodiment, of durable steel tubing (rectangular) and is adapted to fit over a receiver hitch bar mounted on a service or towing vehicle. An opening 108 for a lynchpin is provided for securing tongue 102 to a receiver hitch bar. It is noted herein that a wide variety of hitch-coupling techniques and apparatus may be adapted to cart 100.

Cart 100 has a wheel and axle assembly pivotally attached to frame 104 by pivot arms 106a and 106b in this preferred embodiment. The wheel and axle assembly (wheelbase) comprises wheels 101a and 101b mounted to an axle 107. Axle 107 is, in one embodiment, is a drop down axle. Pivot arms 106a and 106b are pivotally mounted to frame 104 at one end and to axle 107 at the opposite end so that frame 104 may be raised and lowered in height with respect to the position of axle 107. In the view of FIG. 1 frame 104 is illustrated in a state of maximum height Cart 100 has a user-operable translation mechanism connecting the support frame to the wheelbase assembly. A part of this mechanism is a load lift lever 103 adapted in a preferred embodiment to enable lifting of frame 104 relative to axle 107. Lift lever 103 is formed of one contiguous piece of steel in this example. However in other embodiments lever 103 may be an assembly comprising more than one section of tubing. Lever 103 is pivotally attached at both ends to frame 113 near the junctions formed by angle bars 115a and 115b and cross members 116a and 116b.

With the axle and wheels raised relative to frame 104 (or frame 104 lowered relative to axle 107) Lever 103 assumes a substantially upright position with respect to the profile of cart 100. From an upright position, lever 103 may be manually operated in a downward direction to provide lift for frame 104. Lever 103 has 2 arm extensions 110a and 110b provided thereto and rigidly affixed to extend from lever 103 at substantially right angles by welding or other methods and at strategic locations on either side of lever 103. Arm extensions 110a and 110b pivotally attach to lift arms 109a and 109b respectively, so that a pivot range of at least 90 degrees may be achieved during operation of lever 103. Lift arms 109a and 109b are rigidly attached to pivot arms 106a and 106b respectively at the mounted positions of the latter with axle 107. In this way, a user may gain leverage by manually operating lever 103 from an upright position to a downward and extended position as illustrated, to achieve height extension of frame 104 above axle 107. When lever 103 is brought to an upright position, pivot arms 106a and 106b assume a position that is substantially parallel to frame 104.

The unique arrangement described above enables a user, with the cart supported on wheels 101a and 101b, to lift frame 104 and, therefore, tongue 102 to the height of a receiver hitch bar on a towing vehicle, to facilitate coupling thereto without manual lifting that would be associated with a cart having a fixed frame and axle assembly. In a preferred embodiment of the invention, pivot arms (106a, 106b), lift arms (109a, 109b), and extensions (110a. 110b) are manufactured of durable steel bar. In other embodiments other materials can be used.

A folding skid assembly 111 is provided in a preferred embodiment for stabilizing cart 100 when it is under load and not coupled to a towing or a service vehicle. Skid assembly 111 comprises a plurality of folding arms that are pivotally attached to one another to form a foldable swing arm anchored to axle 107 and to frame 104 for support. A pair of folding arms 112 is also provided for support, and these are pivotally attached to tongue 102 at an extension affixed thereto and adapted as a mounting location. A skid 105 is provided to make contact with the ground when folding skid assembly 111 is extended downward. Although not illustrated in this embodiment, all pivotal attachment junctions of the movable apparatus of cart 100 are lockable to assume rigid configuration with respect to varying degrees of lift of frame 104 in relation to the wheelbase and with respect to the intended position of lever 103.

It will be apparent to one with skill in the art that the translation mechanism load-lift apparatus described in this example provides considerable assistance to an operator when attempting to couple cart 100 a receiver hitch bar of a service vehicle. The operation of lifting frame 104 above axle 107 is controlled by lever 103 and associated components, and enables coupling of heavy loads without requiring traditional lifting to attain a coupling height. After cart 100 is coupled to a receiver hitch of a service vehicle, an operator typically will move lever 103 back to an upright position, lifting the wheelbase of cart 100 up from ground level so that cart 100 and its load may be carried behind the vehicle supported entirely on the receiver hitch bar. Skid assembly 111 may be folded up as well so that skid 105 is conveniently tucked under cart 100 and out of the way of ground or pavement in transport. To accomplish such adjustment various of the links of the lift mechanism may have multiple holes for pivotal mounting.

Figure 2:
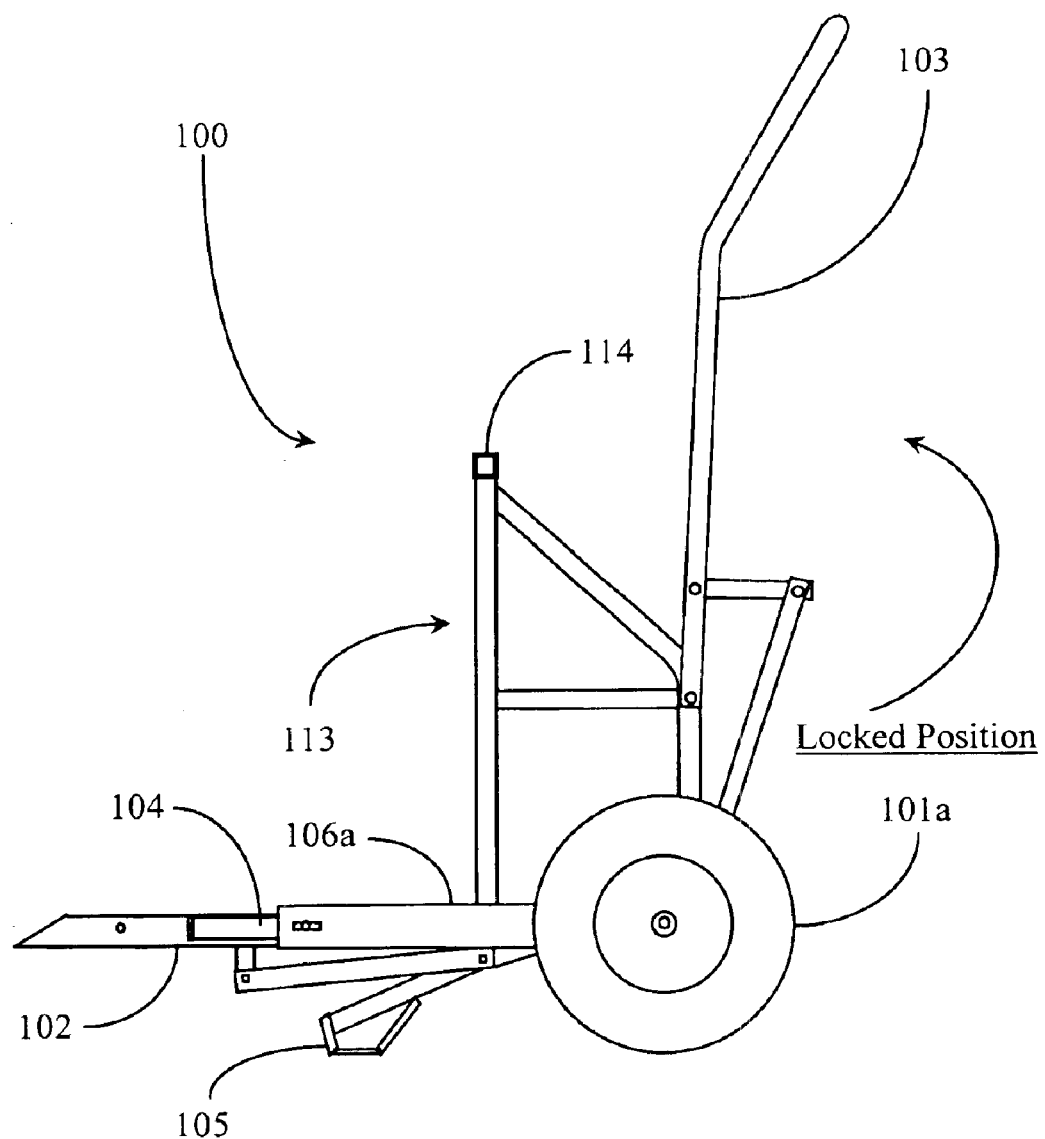
FIG. 2 is an elevation view of the cart of FIG. 1 illustrating a load lever in the upright position.

FIG. 2 is an elevation view of cart 100 of FIG. 1 illustrating load lever 103 locked in the upright position. With the load lever in this position, the cart is at its lowest level, and an operator may manually wheel a load about in the manner of a hand truck, or may mount a conventional trailer hitch on bar 102, and connect the cart to such as an ATV for moving the cart and its load around a job site.

In this lowermost position, pivot arms 106a and 106b (opposite side) are substantially parallel to frame 104 and tongue 102. Skid 105 is folded and locked in position to support any load in a substantially level profile. This position is also the assumed position when cart 100 is coupled to a receiver hitch of a service vehicle, with the wheels off the ground or pavement. In the case of cart 100 coupled to a service vehicle, wheel 101a and skid 105 clear ground more than sufficiently for transport. In this embodiment, the service vehicle, such as a truck, can be fully loaded and still transport the additional load of cart 100. Cart 100 and its load are supported by tongue 102 and the vehicle receiver hitch bar.

Figure 3A:
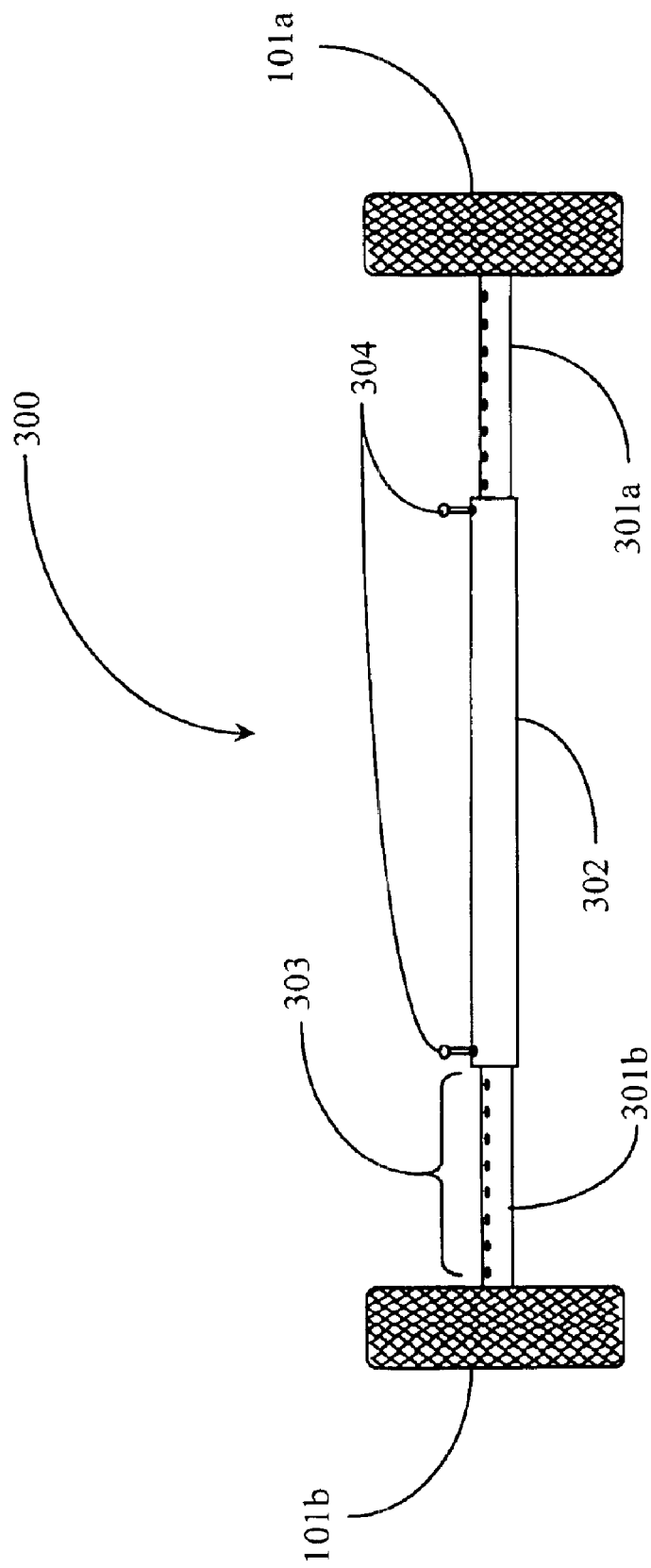
FIG. 3A is a plan view of an extensible axle assembly of the cart of FIG. 1 according to an embodiment of the present invention.

FIG. 3A is a plan view of extensible axle assembly 300 of cart 100 of FIG. 1 according to an embodiment of the present invention. Axle assembly 300 is extensible in a preferred embodiment as was described with reference to drawings 3A, 3B and 4 of provisional patent application Ser. No. 60/353,356. In this example, axle assembly 300 comprises an axle body 302, a right axle extension 301a and a left axle extension 301b. Wheels 101a and 101b complete the wheel-based assembly. Axle extensions 301a, 301b and axle body 302 may be formed of square-section steel tubing or other annular steel tubing. Axle extensions 301a and b may be of varying lengths as long as a full extension permits a desired wheelbase extension of cart 100. In this example, axle extensions 301a and 301b are adapted to fit inside axle body 302. Each axle extension 301a and b has a plurality of pin openings 303 provided to accept a lynchpin. In this embodiment spring-loaded lynchpin assemblies 304 (one per each extension) are provided to engage openings 303 at the desired location of wheelbase extension. By pulling up on pins 304, the openings 303 are disengaged and axle extensions 301a and 301b may be repositioned by sliding them in to make a smaller wheelbase or out to make a larger wheelbase. Positioning pins 304 to engage an opening 303 and releasing the assembly causes engagement of the pins to the openings, thereby locking the extension into place. In other embodiment, other engagement mechanisms may be utilized. There are many known engagement techniques and apparatus.

Figure 3B:
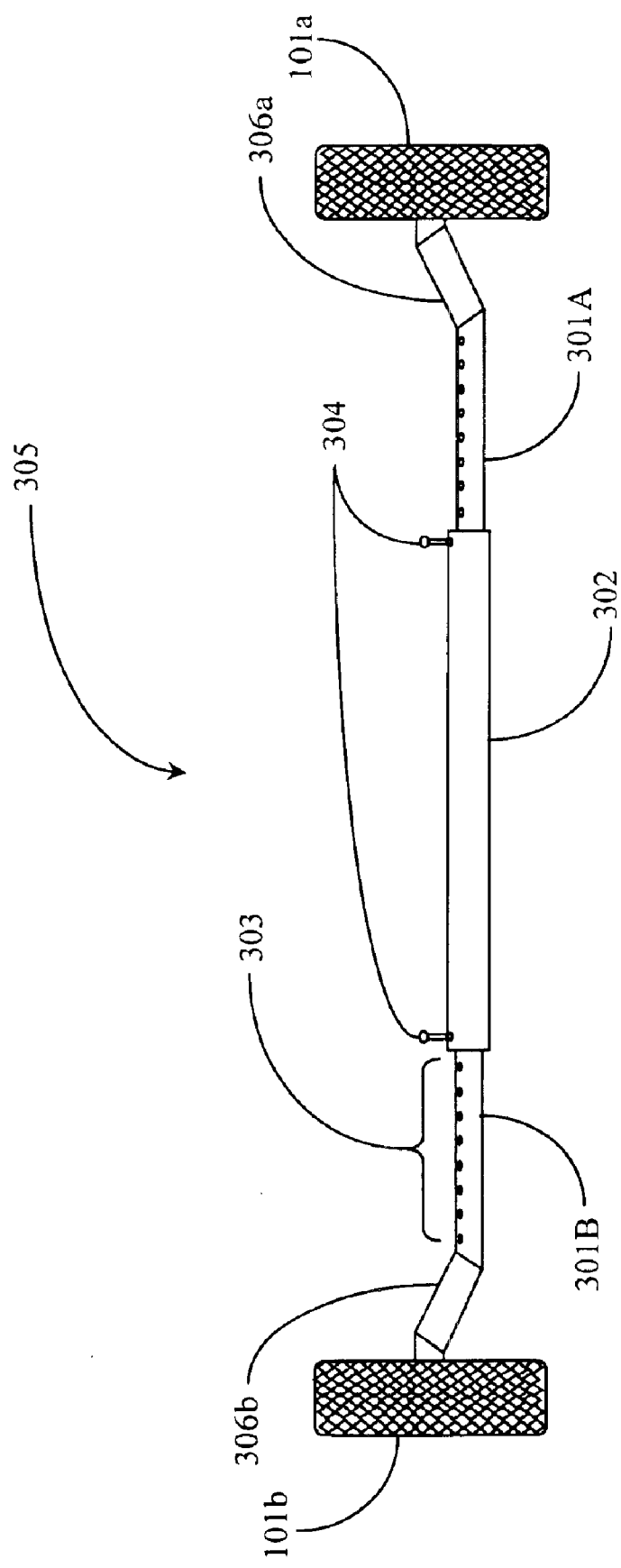
FIG. 3B is a plan view of an extensible axle assembly of the cart of FIG. 1 according to another embodiment of the invention.

FIG. 3B is a plan view of axle assembly 305 of cart 100 of FIG. 1 according to another embodiment of the invention. In this example, axle assembly 305 is a drop-down style axle as described briefly with respect to FIG. 1 above. Axle extensions 301a and 301b are adapted to fit inside axle body 302 in a ridable manner as described above with reference to FIG. 3A. Similarly, wheelbase extension is identically achieved employing lynchpin assemblies 304 and openings 303 as previously described above. However, in this embodiment 2 drop-down extensions 306a and 306b are provided and are affixed to extensions 301a and 301b respectively. Drop-down extensions 306a and b are rigidly attached, such as by welding, to the respective wheel ends of axle extensions 301a and 301b. In this case, wheels 101a and 101b are adapted for drop-down axle installation with a hub that forms a welding location for the wheel-ends of drop-down extensions 306*a* and 306*b*. Square section or annular tubing may be utilized. A drop-axle embodiment is accomplished in such a manner that the center of gravity of cart 100 is substantially lower to the ground than would be the case with a straight axle embodiment.

Figure 4:
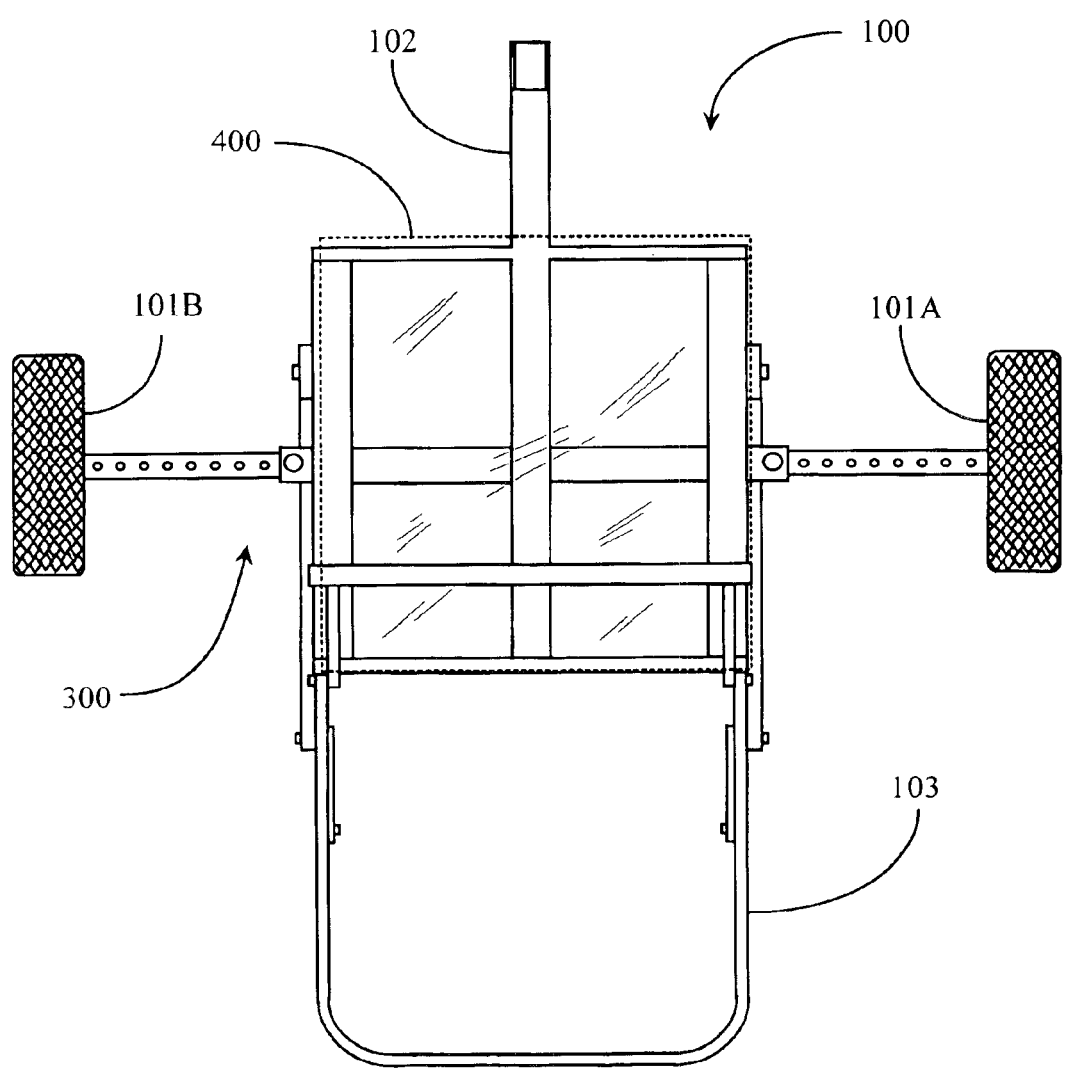
FIG. 4 is an overhead view of the cart of FIG. 1 illustrating full axle extension.

FIG. 4 is an overhead view of cart 100 of FIG. 1 illustrating full axle extension of the wheelbase. Cart 100 is illustrated in this example with axle assembly 300 described with reference to FIG. 3A above. Load lever 103 is illustrated in a down position as illustrated in FIG. 1, to have the frame at its uppermost extension relative to the axle. A load base 400 (broken rectangle) is illustrated in position on frame 104 and adapted as a floor for supporting a payload. Load base 400 may be transparent Plexiglas, a wood floor, an expanded-metal floor, or any other suitable flooring. Base 400 may, in some embodiments be fastened or hinged to frame 104. An advantage of having an extensible wheelbase is that extension provides a more stable wheelbase while retraction to minimal extension provides advantages in maneuvering similar to that of a hand truck.

Figure 5A:
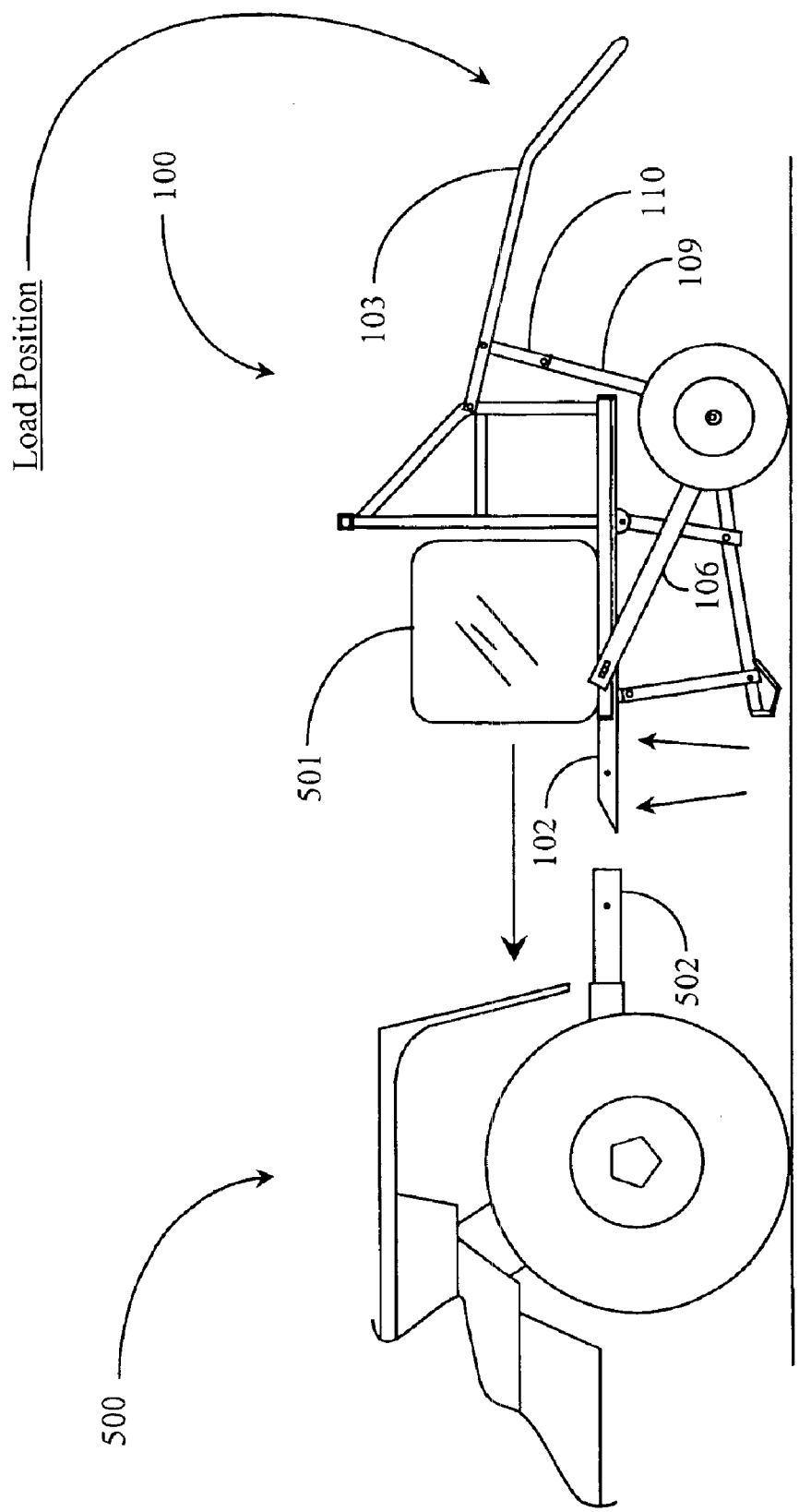
FIG. 5A is an elevation view of the cart of FIG. 1 with a load in a pre-hitch position with respect to a service vehicle.
Figure 5:
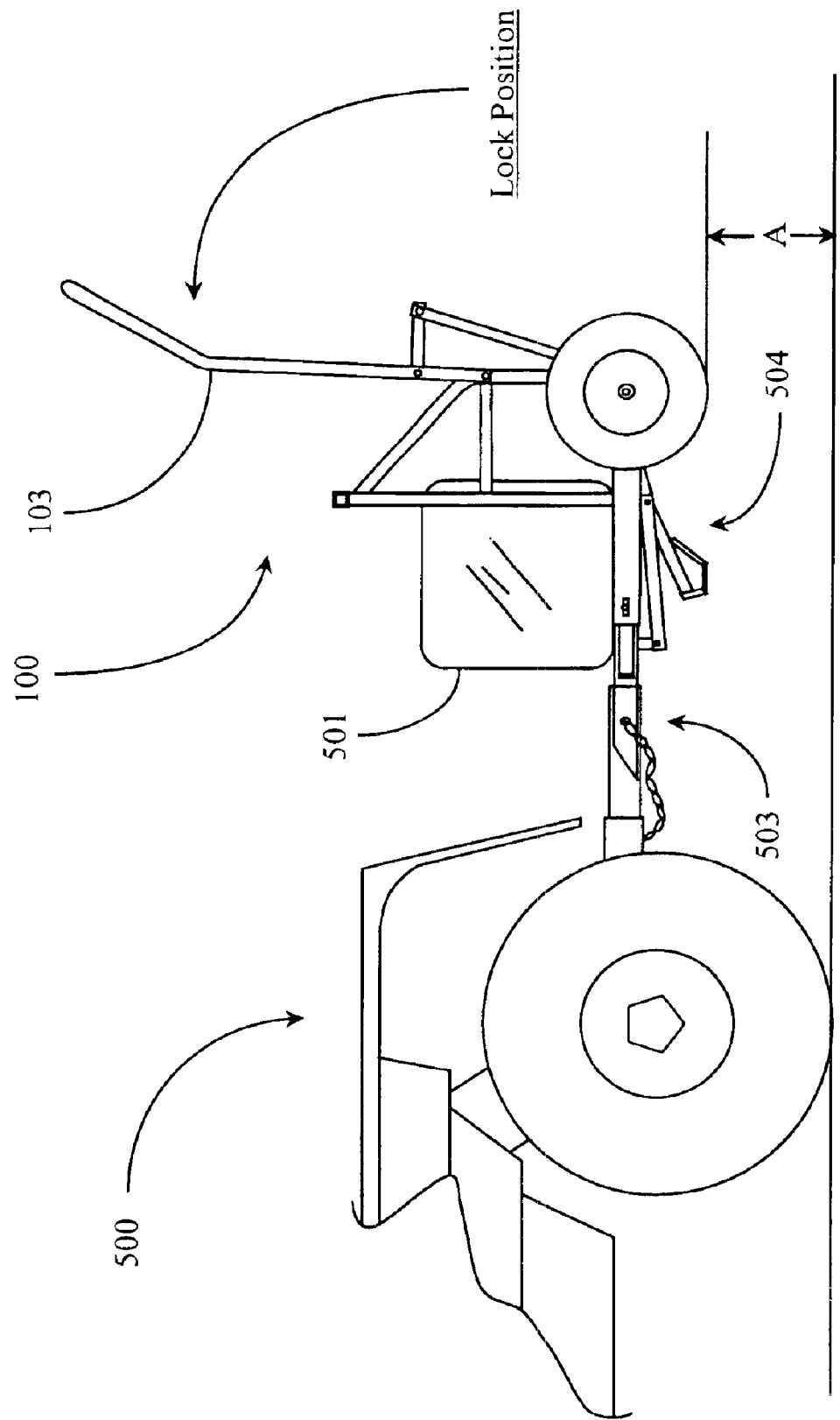
FIG. 5B is an elevation view of the cart of FIG. 5A coupled to the service vehicle.

FIG. 5A is an elevation view of cart 100 of FIG. 1 with a load in a pre-coupling position with respect to a service or vehicle 500. Cart 100 is illustrated with load lever 103 extended downward in load position for elevating tongue 102 to a sufficient height for line-of-sight coupling to receiver hitch apparatus 502 mounted on the rear of service vehicle 500. Cart 100 has a payload 501 supported thereon by frame 104. In one embodiment, load 501 may actually sit on a load base analogous to base 400 described with reference to FIG. 4 above.

To accomplish coupling of cart 100 to the service vehicle, an operator manually moves load lever 103 downward. This action transfers leverage to extensions 110 and lift arms 109 to pivot arms 106 providing the required lift to elevate cart 100 into position. Once proper height is established, cart 100 may be urged forward until tongue 102 engages receiver hitch bar 502. Vehicle 502 is preferably a truck of some description, such as a pickup truck, but may be any other kind of road-capable vehicle having a receiver hitch bar and capable of supporting the weight of the loaded cart.

FIG. 5B is an elevation view of cart 100 of FIG. 5A coupled to service vehicle 500. After cart 100 is lifted and coupled to vehicle 500, the operator swings load lever 103 back into an upright position, raising the cart's wheels from pavement level. A successful coupling 503 is illustrated using a lynchpin and chain to secure the coupling. The skid assembly 504 of cart 100 is folded up as illustrated. A clearance dimension A is established wherein cart 100 is transported without touching ground or pavement. Payload 501 may be a specific piece of equipment that remains mounted to cart 100 for convenience but must be transported in the field away from vehicle 500 in order to perform its function. Payload 501 is transported without any unloading or re-loading requirements. Again, returning to the configuration of FIG. 2, at a job site, with the cart at the lowered position, a standard socket-type hitch may be mounted on tongue 102 to hitch the cart to an ATV or other towing vehicle, such as a small tractor, for example. The cart at the job site may therefore be conveniently transported to any needed area or position, returned to the towing vehicle 500 when work is done, and easily and conveniently loaded to the towing vehicle, as described above, to be transported to other job sites.

Figure 6:
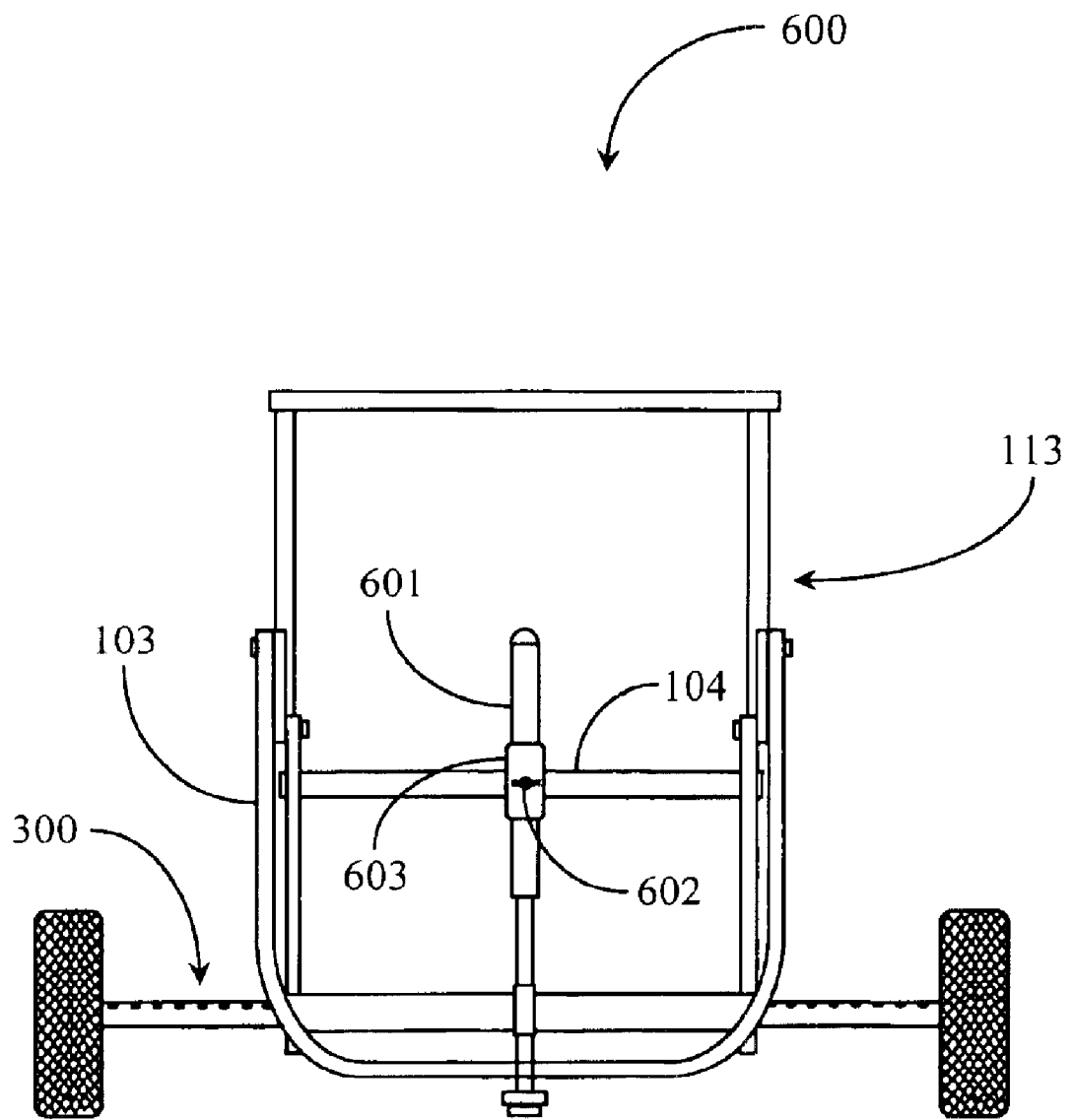
FIG. 6 is a rear elevation view of a hitch-mountable cart enhanced with a mounted jack assembly for assisting with heavy loads.

FIG. 6 is a rear elevation view of a cart 600 enhanced with a jack assembly for lifting heavy loads, particularly in loading and unloading the cart to and from an over-the-road transport vehicle. Cart 600 is illustrated in this embodiment with extensible wheelbase 300 of FIG. 3A. Similar to cart 100 of FIG. 1, cart 600 is illustrated with load lever 103 drawn downward to lift frame 104 above wheelbase 300. In anticipation of a particularly heavy load resting on frame 104, cart 600 is equipped in this example with a jack assembly 601 adapted as a lifting aid to reinforce the action of lift arm 103.

Jack assembly 601, in this example, is a travel screw-style jack that is extended in terms of length by a rotatable jack handle (not shown) that is joined to, and may rotate, the screw of the jack. Typically, counterclockwise rotation applied to the screw extends jack assembly 601 and clockwise rotation acts to retract jack 601. In alternate embodiments, a ratchet-style or hydraulic-style jack may be used.

The base housing of jack 601 is rigidly mounted to frame 104 at its rear cross-member and the extension member of jack 601 is rigidly mounted to the axle of wheelbase 300. Jack 601 may be attached to cart 300 at the two locations by welding, bolting, clamping, or other known methods. A carriage 603 comprises a split-nut for following the jack screw. Again, the jack is incorporated particularly into carts that are expected to carry quite heavy loads, that might be difficult to lift with the lifting lever apparatus alone.

In one embodiment of the present invention, a novel screw jack assembly is utilized with cart 600 wherein the jack has a quick-release mechanism (not shown in FIG. 6) to enable an operator to disengage the follower nut from the travel screw, allowing freedom of movement with respect to raising or lowering the extended position of the jack. This embodiment is a preferred embodiment and is described in more detail below.

Figure 7:
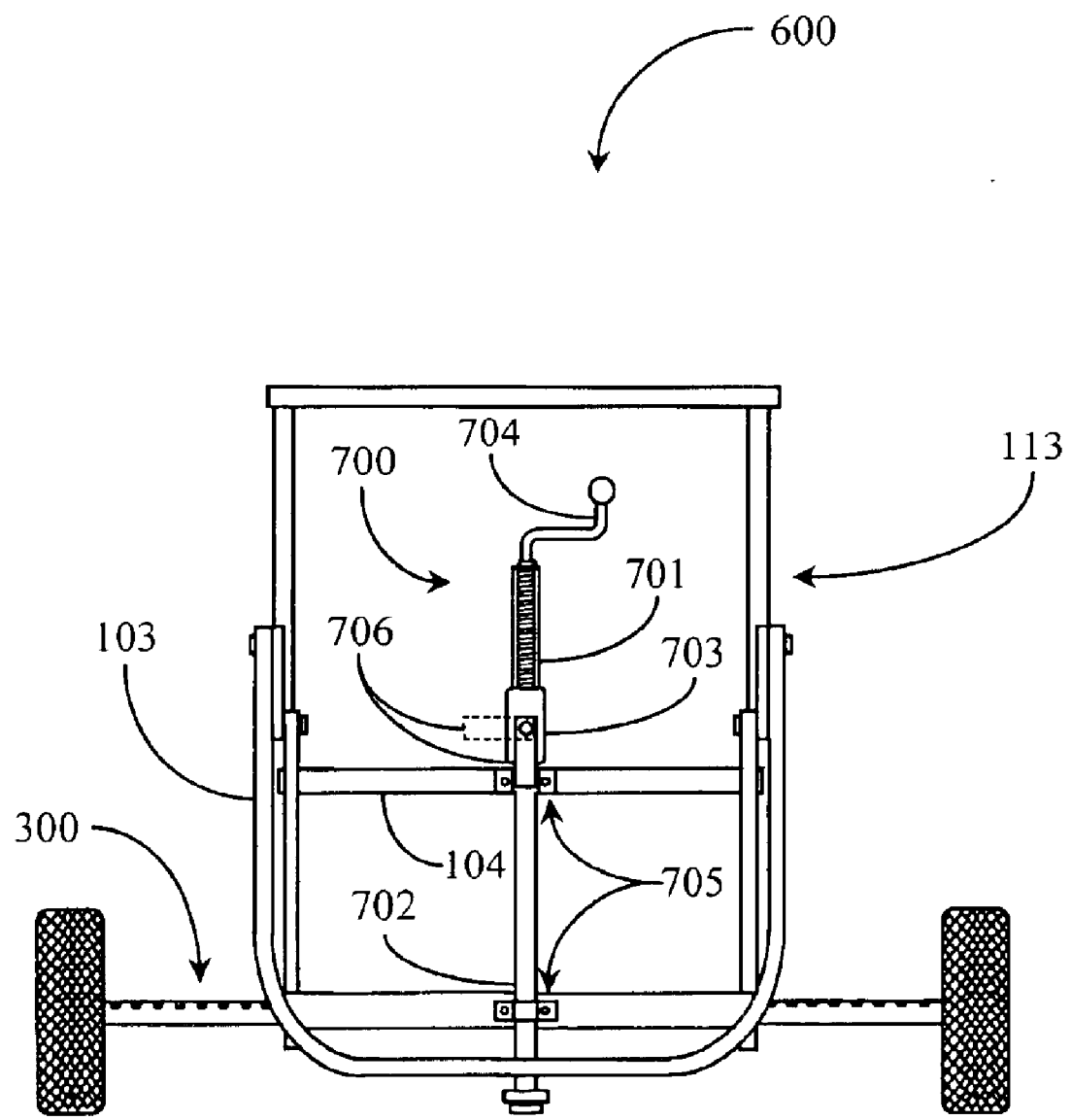
FIG. 7 is a rear elevation view of cart of FIG. 6 illustrating a quick release screw jack implementation according to an embodiment of the present invention.

FIG. 7 is a rear elevation view of cart 600 illustrating a quick-release screw jack implementation 700 according to an embodiment of the invention. Jack 700 comprises a travel screw 701 and a housing 702. In a preferred embodiment, jack 700 is manufactured from rectangular steel tubing forming both the main screw housing and the extendible jack arm. Screw is turned by a screw handle 704 located at the top of jack 700. Handle 704 is adapted with outside diameter (OD) threading and a lock nut (not shown) and is mounted to the travel screw.

Jack 700 is mounted to frame 104 and to the axle of wheelbase 300 as illustrated at mounting locations 705. Mounting methods may vary according to embodiment and may comprise welding, bolting, clamping, or other methods as was described with reference to jack 601 introduced in the description of FIG. 6 above. Jack 700 is equipped with a novel quick release device 703. Device 703 is spring-loaded and lever-operated via a lever 706.

Although not illustrated in detail in this figure, device 703 comprises a half-nut threaded on its inner diameter so that it mates with the threading of the travel screw of jack 700. Spring tension and other components not visible in FIG. 7 work together so that when lever 706 is rotated approximately 90 degrees (illustrated as a dotted rectangle) from its seated position on device 703, the half nut is moved away from the travel screw against spring tension, enabling extension arm 702 to slide independently of main screw housing 701. When lever 706 is rotated back to its seated position, the half nut is forced back against the travel screw under spring tension so that normal controlled raising or lowering operations can be implemented using screw handle 704. Further detail of the internal components of device 703 are detailed below in this specification.

In one embodiment, an operator may disengage jack assembly 700 by rotating lever 706 so that it is in a free mode and then draw down load lever 103 to lift a load to a desired height for vehicle coupling. At the proper elevation distance, the operator then engages lever 706 back to its original seated position forcing the half nut against the travel screw stabilizing jack 700 so that load lever 103 may be safely released from the operator's grip. When the operator is ready to lower the payload, he or she engages jackscrew handle 704 to lower frame 104 and the heavy payload with the travel screw safely engaged. This prevents a possibility of load lever 103 suddenly springing up and hitting an operator, as would be the case of a cart having no jack assembly adapted for the purpose. The jack can also be used to lift exceptionally heavy loads.

Figure 8:
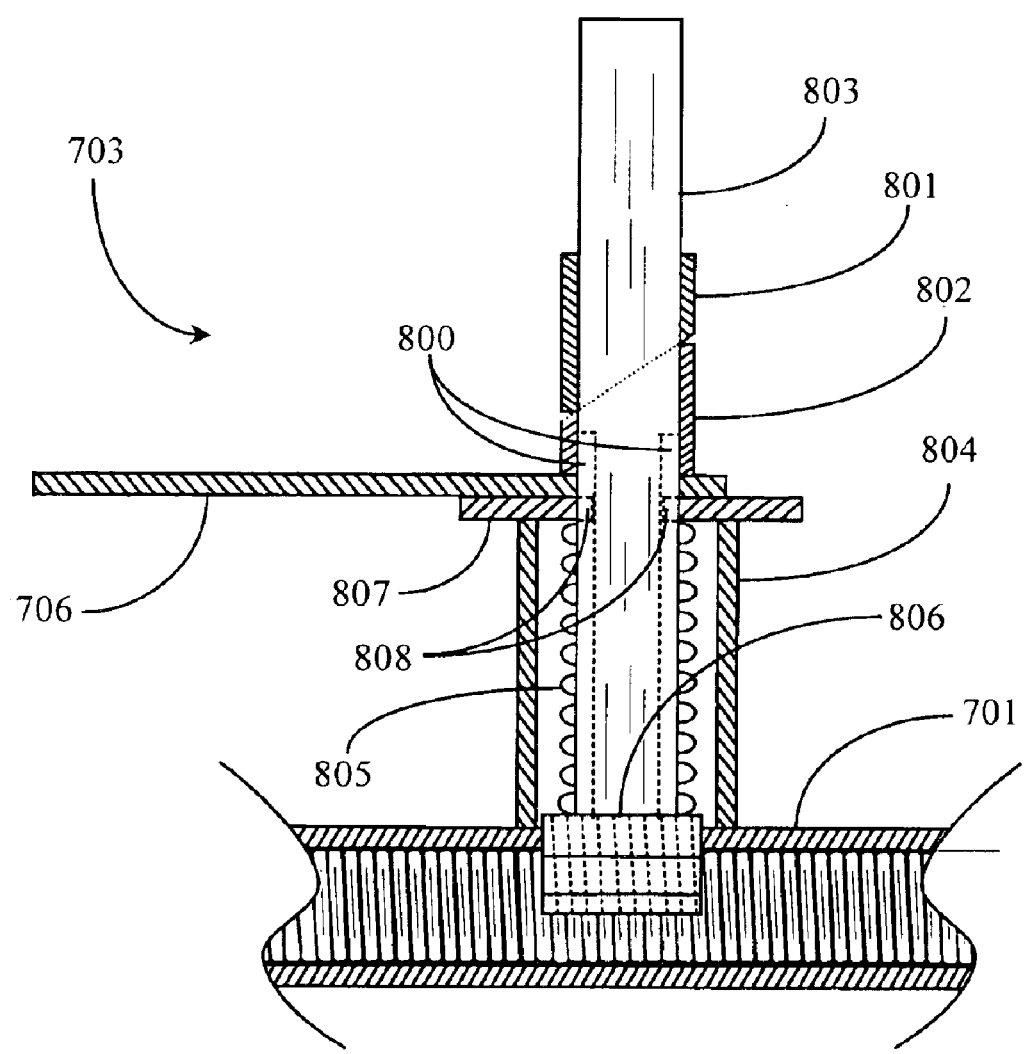
FIG. 8 is a section view of the quick-release device of FIG. 7 illustrating internal components for engaging and disengaging the travel screw of the jack according to an embodiment of the present invention.

FIG. 8 is a section view of device 703 of FIG. 7 illustrating internal components for engaging and disengaging the travel screw of jack 700 according to an embodiment of the present invention. Device 703 is illustrated in this example without an outer housing and sectioned to reveal components required to enable the device. Travel screw housing 701 has a channel opening provided therein running along its longitudinal axis and adapted for the purpose of enabling access to the travel screw contained therein. A half nut 806 is provided to engage the travel screw via mating threads formed about its inner diameter so that when engaged, the travel screw has a rigid screw housing to turn against for elevating and lowering operations.

Half nut 806 is rigidly attached by weld or other known methods to an engagement shaft 803. Engagement shaft 803 is, in a preferred embodiment, made of a steel rod. A base collar 804 is provided to seat against travel screw housing 701 and is rigidly attached thereto by weld or other known methods. Base collar 804 may be formed of a section of steel tubing or other durable metals. Base collar 804 has a back plate 808 rigidly attached thereto by weld or other known methods. Back plate 806 is, in a preferred embodiment formed of a steel sheet stock of suitable thickness and overall dimension to seal off the inside area of base collar 804.

Plate 806 has a keyed opening provided therethrough and adapted for the purpose of receiving engagement shaft 803 in a slidable and keyed manner in order to maintain proper alignment of the shaft in operation. Alignment tabs 808 are left at 180 degrees in the opening of plate 807, the tabs fitting into longitudinal grooves 800 placed at 180 degree locations in shaft 803. In this way, shaft 803 and half nut 806 remain rigidly aligned for engagement in the assembly. The alignment method used in this example should not be construed as a limitation of the present invention as one with skill in the art will recognize that there are other ways to align shaft 803 and half nut 806 to properly engage the travel screw.

A steel spring 805 is provided to fit snugly around engagement shaft 803 and is rigidly attached at one end to the outside face of half nut 806. Spring 805 is moderately compressed against back plate 806 to provide suitable engagement pressure on the travel screw for half nut 806. Lever 706 has an opening provided therethrough that is adapted to receive shaft 803 in a slidable and rotatable manner. The bottom face of lever 703 is frictionally slidable against the top face of back plate 806.

Lever 706 has a collar 802 rigidly attached thereto by weld or other known methods. Collar 802 has an inner diameter adapted to receive shaft 803 and is attached to lever 706 in alignment with the opening there through. Collar 802 is angle cut at its free end at an angle of approximately 45 degrees, forming a cam. It is noted that the described angle cut may be more or less than 45 degrees without departing from the spirit and scope of the invention. Collar 802 is, in a preferred embodiment manufactured of steel tubing. Shaft 803 has a stop collar 801 adapted to fit over shaft 803 and be rigidly attached in place on shaft 803 by welding or other known methods. Stop collar 801 is angle cut on the end facing collar 802 at the same angle as the cut provided to collar 802 such that the angle cut surfaces of both collars seat wholly against each other with collar 801 aligned and affixed according to the previously mentioned grooves in shaft 803.

In this embodiment, half nut 806 may be disengaged from the travel screw by rotating lever 706 in either a clockwise or counterclockwise direction (see FIG. 7). Such action applied to lever 706 forces collar 802 to rotate against fixed stop collar 801 along the angle-cut surfaces breaking the surface contact and forcing shaft 803 in an upward direction against the spring tension provided by spring 805 thereby disengaging half nut 806 from the travel screw. A 180 degree rotation in this example provides the furthest upward extension of half nut 806 away from the travel screw. A stop and lock mechanism (not shown) may be provided to the assembly to ensure that the force of spring 805 does not inadvertently caused the rotation of lever 706 to reverse itself due to the natural tendency for the angled surfaces of the mating collars to right themselves under spring tension.

It will be apparent to one with skill in the art that the components enabling device 703 may be of differing configuration and design without departing from the spirit and scope of the present invention. The inventor intends that the present example of FIG. 8 illustrate just one possible implementation. It will also be apparent that the engagement pressure or force on half nut 806 against the travel screw can be adjusted by varying the gauge of spring 805 in the assembly and by adjusting the state of compression of the selected spring against back plate 807. There are many possibilities.

Referring now back to FIG. 3B, in yet another embodiment wheels 101A and 101B may be provided in the form of caster wheels (also known as crazy wheels) and mounted to axle assembly 305 using standard caster wheel hardware to enable free rotation of the wheels about a vertical axis. This embodiment is particularly useful when the cart is towed by an ATV and the method of coupling is a standard trailer ball and hitch assembly. In this embodiment, a stabilizer bar may be provided to secure the coupling from normal side-to-side movement while being towed.

It will be apparent to one with skill in the art that the receiver hitch-mountable cart of the present invention provides reduction in labor associated with loading and unloading as well as flexibility in maneuvering loads over rough terrain behind a coupled service vehicle, as well as flexibility of maneuvering loads while uncoupled from the service vehicle. According to the many embodiment presented herein, the present invention should be afforded the broadest possible scope under examination. The spirit and scope of the present invention shall be limited only by the claims that follow.

What is claimed is:

1. A receiver hitch-mountable utility cart comprising;
   a support frame for supporting a payload;
   a hitch arm rigidly attached to the support frame, the hitch arm shaped to engage a receiver hitch bar of an over-the-road vehicle;
   a wheelbase assembly with wheels for transporting the cart with the wheel on the ground; and a user-operable translation mechanism comprising a lever-operated load lift assembly connecting the wheelbase to the frame;

characterized in that operating the lever of the load lift assembly raises or lowers the frame relative to the wheelbase assembly, such that the cart, with the support frame in an uppermost position, may be aligned and connected to the receiver hitch bar of the over-the-road vehicle, and the wheels may then be retracted to carry the cart entirely on the receiver hitch bar.

2. The hitch-mountable cart of claim 1 wherein, after hitching the cart to the over-the-road vehicle, the user-operable translation mechanism may be urged to and locked in an upright position, lifting the wheelbase off of the ground while the cart is transported.

3. The hitch-mountable cart of claim 1 wherein the wheelbase assembly comprises 2 wheels and a supporting axle.

4. The hitch-mountable cart of claim 3 wherein the axle comprises an axle housing and a pair of axle extension members enabling length extension of the wheelbase.

5. The hitch-mountable cart of claim 3 wherein the axle is a drop-down axle for lowering the center of gravity of the cart.

6. The hitch-mountable cart of claim 1 further comprising a jack assembly rigidly attached to the frame and wheelbase for providing assistance in lowering and lifting heavy payloads supported on the cart.

7. The hitch-mountable cart of claim 1 enabled to be transported on the wheelbase as a hand-truck when not coupled to the over-the-road vehicle.

8. The hitch-mountable cart of claim 1 further comprising a socket-type trailer hitch, enabling the cart to towed by a small tractor or an all-terrain vehicle at a job site.

9. The hitch-mountable cart of claim 3 wherein the at least 2 wheels are freely rotatable caster wheels mounted to the axle with castor hardware.

10. A method for transporting a receiver hitch-mountable cart by an over-the-road vehicle, the cart comprising a support frame for supporting a payload, a hitch arm rigidly attached to the support frame, the hitch arm shaped to engage a receiver hitch bar of an over-the-road vehicle, a wheelbase assembly with wheels for transporting the cart with the wheels on the ground, and a user-operable translation mechanism comprising a lever-operated load lift assembly connecting the wheelbase to the frame, enabling the frame to be raised and lowered relative to the wheelbase assembly by operation of the load-lift lever, the method comprising the steps of:

(a) positioning the cart behind the service vehicle;
(b) operating the lever of the translation mechanism to elevate the frame and the hitch apparatus to an elevation aligned for engaging the receiver hitch;
(c) moving the cart forward to engage the receiver hitch; and
(d) securing the coupling.

11. The method of claim 10 further comprising a mechanical jack between the support frame and the wheelbase assembly, and in step (b) the jack is used to aid in raising or lowering of the support frame relative to the wheelbase assembly.

12. The method of claim 10 further comprising a step (e) for operating the translation mechanism to elevate the cart wheels off of the ground after the coupling is secured.

13. The method of claim 12 wherein in step (e) the user-operable translation mechanism is lockable into the upright position for secure transport.

14. The receiver hitch-mountable utility cart of claim 11 wherein the mechanical jack comprises a quick-release mechanism for disengaging the jack for rapid repositioning.

15. The receiver hitch-mountable utility cart of claim 14 wherein the mechanical jack is a screw jack, and the quick-release mechanism comprises a half nut mounted on a spring-loaded retractable member, such that the half nut may be released from the jack screw.

16. The receiver hitch-mountable utility cart of claim 15 wherein the engagement-disengagement mechanism is spring loaded and lever operated.

* * * * *